Dec. 20, 1960  A. G. DE CLAIRE, JR  2,965,090
LIQUID FUEL METERING DEVICE
Filed May 27, 1957
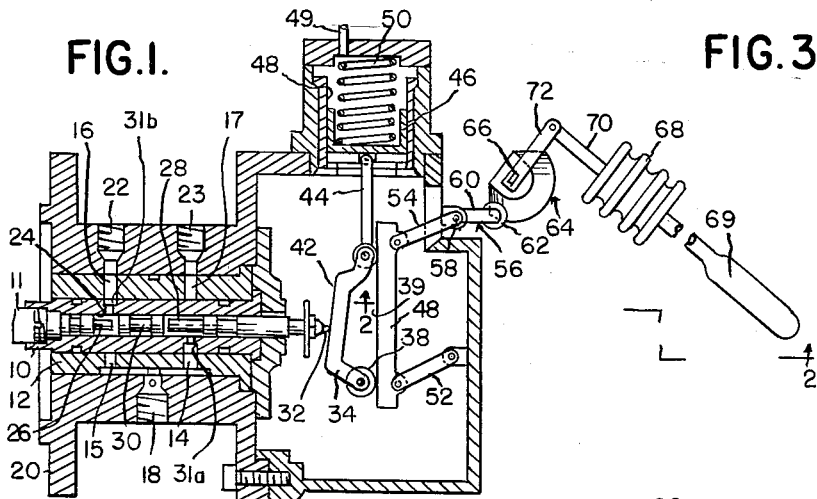
FIG.I.
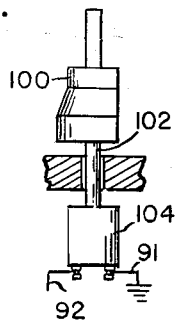
FIG.3.
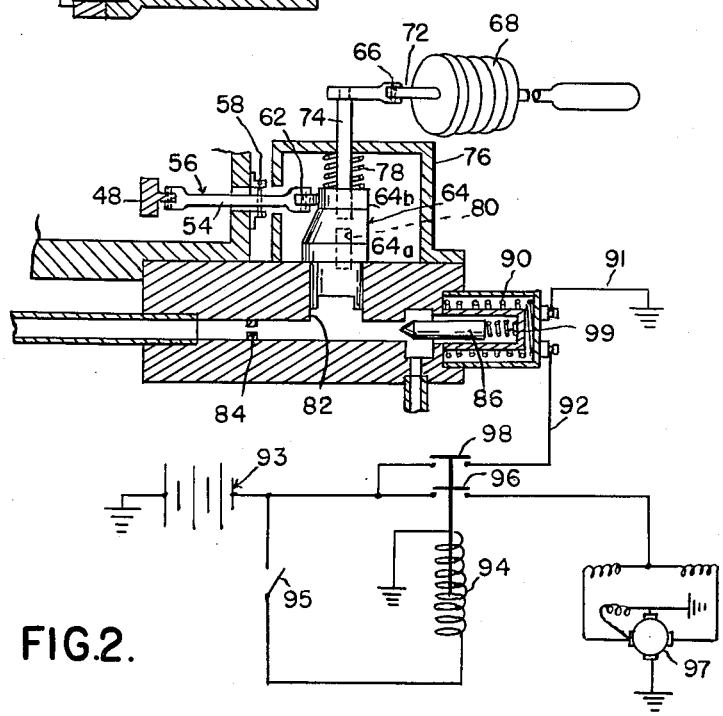
FIG.2.
INVENTOR.
ALTON G. DeCLAIRE JR.
BY Whittemore
Hulbert & Belknap
ATTORNEYS

United States Patent Office 2,965,090
Patented Dec. 20, 1960

2,965,090

LIQUID FUEL METERING DEVICE

Alton G. De Claire, Jr., Harper Woods, Mich., assignor to Holley Carburetor Company, Van Dyke, Mich., a corporation of Michigan Filed May 27, 1957, Ser. No. 661,934

11 Claims. (Cl. 123—179)

The present invention relates to a liquid fuel metering device of the shuttle-type to which the fuel is supplied from a pump and from which the fuel is discharged intermittently to an internal combustion engine.

It is an object of the present invention to provide means for regulating the quantity of fuel metered into each charge in accordance with manifold pressure and engine operating temperature, and to effect a further control for supplying fuel to the engine at a controlled rate during starting.

More specifically, it is an object of the present invention to provide means for varying the size of the individually metered charges of fuel supplied to the engine in accordance with engine temperature and at a scale determined by whether the engine starter is energized or whether the engine is running.

Still more specifically, it is an object of the present invention to provide a fuel metering system including a pumping and metering shuttle movable between a fixed and movable abutment, means for effecting adjustment of the movable abutment to control the quantity of fuel in each charge, and means operable to supply fuel at different rates dependent upon temperature and dependent upon whether the engine starter is energized or the engine running under its own power.

Still more specifically, it is an object of the present invention to provide a three dimensional cam for effecting a control of the quantity of fuel metered to an internal combustion engine having an electric starter in which the cam is shifed longitudinally between limiting positions dependent upon energization of the starter, and in which the three dimensional cam is rotated in accordance with an engine temperature in either of its two longitudinal limiting positions.

Other objects and features of the invention will become apparent as the description proceeds, especially when taken in conjunction with the accompanying drawings, illustrating preferred embodiments of the invention, wherein:

Figure 1 is a sectional view through the fuel metering apparatus.

Figure 2 is a fragmentary sectional view of a portion of the structure shown in Figure 1, taken substantially on the line 2—2, Figure 1.

Figure 3 is a fragmentary sectional view illustrating a modification of the invention.

Referring first to Figures 1 and 2, the invention relates to fuel metering apparatus particularly designed for fuel injection. The present invention is applied to the type of injection apparatus illustrated in Downing Patent 2,731,175 to which reference is made for details of the metering and pumping system. It should be understood however, that the present invention is not limited to the particular construction shown by Downing, since the invention is applicable to any apparatus for metering fuel to an internal combustion engine.

Described very generally, this construction comprises an elongated cylindrical element 10 rotatable by drive means such as shaft 11 at a rate dependent on engine speed in a sleeve 12 having inlet passages 14 and 15 and outlet passages 16 and 17. The inlet passages 14 and 15 are in communication with a threaded opening 18 in a casing 20, and the outlet passages 16 and 17 are in communication with threaded outlet passages 22 and 23 located in the casing. It will of course be understood that passage 18 connects to a fuel pump and constitutes means for supplying fuel under pressure to the fuel metering device. Similiarly, passages 22 and 23 are for connection to the cylinders of an internal combustion engine.

The element 10 has a longitudinally extending cylindrical opening 24 provided adjacent one end with a fixed abutment 26 and adjacent its other end with a movable abutment 28. Intermediate the abutments 26 and 28 is a shuttle 30. In addition, element 10 has a radial passage 31a alternately in communication with passages 14 and 17, and a second radial passage 31b alternately in communication with passages 15 and 16.

By rotation of the element 10, pressure is admitted alternately to the cylinder 24 at opposite sides of the shuttle 30. With the parts in the position illustrated, it will be observed that fluid under pressure is admitted to the cylinder 24 to the right of the shuttle 30 through the passages 14 and 31a and will accordingly move the shuttle to the left expelling fluid through the outlet passage 24 and opening 22. The quantity of fuel discharged during movement of the shuttle is of course determined by the spacing between the fixed and movable abutments. At the same time, movement of the shuttle 30 to the left admits a metered quantity of fuel into the cylinder to the right of the shuttle again as determined by the spacing between the abutments. Upon further rotation of the element 10, the pressure fluid supplied through the passage 18 enters the cylinder through the passages 15 and 31b and shifts the shuttle to the right, thus expelling a metered quantity of fuel under pressure through the outlet passages 17 and 23. This operation is repeated and at each movement of the shuttle 30, a quantity of fuel metered in accordance with the position of the movable abutment 28 is expelled from one or the other of the outlet passages or ports 22 or 23.

From the foregoing it will be observed that the quantity of fuel discharged at each movement of the shuttle 30 is directly dependent upon the position of the movable abutment 28.

In accordance with the present invention novel means are provided for effecting a desired control of the adjustment of the abutment 28.

The means for effecting adjustment of the abutment 28 comprises a nose 32 on the end of the movable abutment or on a element connected thereto.

Associated with the movable abutment 28 is an elongated carriage 34 having rollers 36 and 38 movable along the surface 39 of an elongated rail 40. The carriage 34 has a camming surface 42 which may be straight or have some non-linear modification thereto but which in any event is non-parallel to the surface 39 of the rail 40. Connected to the carriage 34 is a link 44 which in turn is connected to a piston 46 movable in a cylinder 48, the interior of the cylinder being connected to the manifold of the internal combustion engine by a conduit indicated diagrammatically at 49. Accordingly, upon variation in engine load or density, the piston 46 is positioned by the joint action of the spring 50, the reduced pressure existing within the cylinder, and atmospheric pressure acting on the outer surface of the piston. This in turn effects generally longitudinal adjustment of the carriage 34. Inasmuch as its surface 42 is not parallel to the surface 39, movement of the carriage 34 effects an adjustment of the abutment 28 in a direction parallel to the cylinder 24.

Means are also provided for effecting a desirable setting and adjustment of the rail 40. For this purpose the rail is mounted on links 52 and 54, the link 54 being one arm of a bell crank lever 56 pivoted as indicated at 58 and having a second arm 60 provided with a cam follower roller 62.

The position of the rail 40 is determined by the position of a three dimensional cold start and drive away control cam 64. The cam 64 is mounted for angular adjustment about an axis 66 by means of temperature responsive means such for example as an expansible bellows 68 connected to bulb 69 and having a link 70 connecting one end to a crank arm 72. Bulb 69 may be located in a position to be affected by a selected engine temperature.

The cam 64 is also mounted for movement longitudinally in a direction parallel to its axis of angular adjustment. For this purpose the three dimensional cam includes a stem 74 extending through an opening in a support member 76 and a spring 78 biasing the cam 64 downwardly as viewed in Figure 2. The stem 74 is of noncircular shape and is slidably received in a similarly shaped opening 80 extending into the cam 64. Thus, the body of the cam may be shifted vertically as seen in Figure 2, without disturbing the relationship between its rotating stem 74, the crank arm 72, and the temperature responsive bellows 68. The cam has end camming surfaces 64a and 64b selectively operable during starting and warm up operation of the engine. These surfaces are generated by straight line elements parallel to the axis of the cam, and hence side thrust on lever 56 is avoided.

The lower end of the cam, as seen in Figure 2, is received within a cylindrical chamber 82 where it is operable as a piston.

It will be recalled that the fuel metering apparatus operates to meter engine fuel supplied under pressure and the pressure at which the fuel is supplied may be relatively high, as for example 100 p.s.i. This high pressure fuel is normally supplied through an independently actuated fuel pump such for example as an electrically operated fuel pump. While fluid pressure from any suitable source may be admitted to chamber 82, it is desirable to use high pressure fuel which is available whenever the engine is being started. In any case, fluid under pressure is admitted into the chamber 82 through a restriction 84 and escape of this fuel is normally prevented by solenoid valve 86. Accordingly, pressure builds up in the chamber 82 and shifts the three dimensional cam 64 upwardly to a limiting position as determined by suitable stop means such for example as engagement between the end of the stem 74 and the bottom of recess 80.

The windings 90 of the solenoid valve 86 are in circuit with the electric starter so that when the starter circuit is closed, the valve 86 is opened and pressure in the chamber 82 drops, thus permitting the three dimensional cam 64 to move downwardly under the influence of spring 78.

The solenoid winding 90 is grounded as indicated at 91 and is connected by a line 92 to the starter circuit. The starter circuit comprises the grounded battery 93, and a starter relay 94 energized by starter switch 95. The relay 94 includes a first contact 96 connecting the battery to the grounded starter motor 97, and a second contact 98 connecting the winding 90. Thus, so long as the starter motor 97 is energized the valve 86 is open and the cam 64 is in the position illustrated in Figure 2. When the stater circuit is de-energized so also is the winding 90 and the valve 86 is moved to closed position by the spring 99.

Accordingly, the three dimensional cam is movable longitudinally between limiting positions dependent upon whether the starter circuit is energized or not. In either limiting position of its longitudinal movement, the cam 64 is rotated to a degree determined by a selected engine temperature such for example as temperature of the cooling system.

With the foregoing description in mind it will be observed that when the engine is cranked by energizing the starter circuit, the cam is shifted to a position which allows the cam follower roller 62 to engage the smaller end of the cam as seen in Figure 1. This in turn rocks the bell crank lever 56 and link 54 counterclockwise, moving the rail 40 and the control surface 42 of the carriage 34 away from the metering unit, thus providing an increased separation between the fixed and movable abutments. This in turn provides extra fuel and a rich mixture for starting. As soon as the engine starts the starter circuit is of course interrupted and the valve 86 immediately closes. Pressure builds up quickly in the chamber 82 and shifts the cam 64 upwardly as seen in Figure 2, thus bringing a higher contoured surface thereof into registration with the cam follower roller 62. The contour of the cam is such that a suitably rich mixture is provided after starting until the engine becomes sufficiently warm to operate efficiently on a leaner mixture.

In Figure 3 there is illustrated a variation of the foregoing construction. In this case a three dimensional cam 100 is mounted for longitudinal movement by an extension 102 which connects to a solenoid 104 which is in the electric starter circuit. Again, the cam 100 is rotatable about its longitudinal axis by means of a suitable crank (not shown) which may be identical with the crank 72 seen in Figures 1 and 2. Thus, in the construction illustrated in Figure 3, the operation is identical except that longitudinal shifting of the cam 100 between its starting and running positions is accomplished directly by a solenoid, rather than by employing a solenoid to control an actuating fluid pressure. It will be understood that solenoid 104 is connected into the starter circuit in the same manner as windings 90, the ground connection 91 and line 92 being indicated in the figure.

While there has been given a detailed description of a preferred embodiment of the present invention, it may be noted that considered broadly, the invention may be regarded as related to first means responsive to a temperature or to another operating condition of the engine such for example as manifold vacuum, or both, for effecting a modulating control of the fuel metering means in conjunction with additional means for effecting a control of the first means dependent upon a condition of the engine as related to starting and running. The first means is therefore effective to effect a modulating control in accordance with a selected one of two different programs appropriate to starting or running condition of the engine, and the proper program is selected, either automatically in conjunction with operation of the starter as disclosed herein, or alternatively under the selected control of the operator.

The drawing and the foregoing specification constitute a description of the improved liquid fuel metering device in such full, clear, concise and exact terms as to enable any person skilled in the art to practice the invention, the scope of which is indicated by the appended claims.

What I claim as my invention is:

1. Fuel metering apparatus for an internal combustion engine having an electric starter, comprising an elongated movably mounted rail, a carriage movable longitudinally on said rail, said carriage having an elongated cam surface extending at an angle to said rail, a fuel control element having a portion engaging said cam surface to be positioned thereby, means responsive to manifold pressure connected to said carriage for moving it along said rail, a three dimensional cold start and drive away control cam body, means connected to said rail including a cam follower engaging said cam body for adjusting the position of said rail, said cam body being mounted for longitudinal and angular adjustment, means operable as an incidence of and during energization of the starter, to effect one of said adjustments of said body, and means responsive to an engine temperature condition for effecting the other of said adjustments of said body.

2. Fuel metering apparatus for an internal combustion engine having an electric starter, comprising an elongated movably mounted rail, a carriage movable longitudinally on said rail, said carriage having an elongated cam surface extending at an angle to said rail, a fuel control element having a portion engaging said cam surface to be positioned thereby, means responsive to manifold pressure connected to said carriage for moving it along said rail, a three dimensional cold start and drive away control cam body, means connected to said rail including a cam follower engaging said cam body for adjusting the position of said rail, said cam body being mounted for longitudinal and angular adjustment, means operable as an incidence of and during energization of the starter to shift said body longitudinally between limiting positions, and means responsive to an engine temperature condition for effecting angular adjustment of said body.

3. Fuel metering means for an internal combustion engine having an electric starter including a pumping and metering shuttle movable between a fixed and a movable abutment, means for adjusting said movable abutment comprising an elongated movable rail, a carriage movable longitudinally on said rail, said carriage having a cam surface thereon, cam follower means connected to said movable abutment and engaging said cam surface, a three dimensional cam body mounted for longitudinal and angular adjustment, means including a cam follower engageable with said body for variably positioning said rail, means operable during cranking of the engine for shifting said body to one limit of its longitudinal movement, and means responsive to an engine temperature for effecting angular adjustment of said body in any position of longitudinal adjustment.

4. Fuel metering means for an internal combustion engine having an electric starter including a pumping and metering shuttle movable between a fixed and a movable abutment, means for adjusting said movable abutment comprising an elongated movable rail, a carriage movable longitudinally on said rail, said carriage having a cam surface thereon, cam follower means connected to said movable abutment and engaging said cam surface, a three dimensional cam body mounted for longitudinal and angular adjustment, means including a cam follower engageable with said body for variably positioning said rail, means operable during cranking of the engine for shifting said body to one limit of its longitudinal movement, said last named means comprising a piston and cylinder device connected to said body, means for supply fluid under pressure to said device, valve means operable during cranking of the engine to control the application of pressure to said device, and means responsive to an engine temperature for effecting angular adjustment of said body in any position of longitudinal adjustment.

5. Apparatus as defined in claim 4 which comprises a fuel pump for supplying fuel under pressure to said metering means, and in which the fuel under pressure is the source of fluid pressure for said device.

6. Fuel metering means for an internal combustion engine having an electric starter including a pumping and metering shuttle movable between a fixed and a movable abutment, means for adjusting said movable abutment comprising an elongated movable rail, a carriage movable longitudinally on said rail, said carriage having a cam surface thereon, cam follower means connected to said movable abutment and engaging said cam surface, a three dimensional cam body mounted for longitudinal and angular adjustment, means including a cam follower engageable with said body for variably positioning said rail, solenoid means energized during energization of said starter for shifting said body to one limit of its longitudinal movement, and means responsive to an engine temperature for effecting angular adjustment of said body in any position of longitudinal adjustment.

7. Fuel metering apparatus for fuel injection to an internal combustion engine having an electric starter comprising a movable abutment for determining the quantity of fuel in each charge, a starting temperature responsive control system, a running temperature responsive control system, both of said systems including means responsive to manifold pressure for adjusting said abutment, means directly responsive to energization of said starter to select said starting or running temperature control system, and means directly included in both of said systems responsive to an engine temperature to effect a gradual adjustment of said abutment in accordance with engine temperature.

8. Means for metering fuel to an internal combustion engine, means for controlling the metering means including means directly responsive jointly to engine temperature and manifold vacuum operable to directly effect a modulating control of said metering means, and means directly responsive to the engine starting and running conditions to directly impose a starting or running program of modulation on the means responsive to temperature and manifold vacuum.

9. Means for metering fuel to an internal combustion engine including first means for directly controlling the metering means in accordance with the parameters of engine temperature and manifold vacuum, and second means for directly superimposing thereon a second control in accordance with the parameters of starting or running conditions of the engine.

10. Fuel metering and pumping apparatus for an internal combustion engine comprising a movable member whose position determines the rate of fuel metering, adjusting means directly engageable with said movable member comprising means directly responsive jointly to engine temperature and manifold vacuum operable to directly effect a modulating control of said metering means, and means directly responsive to the engine starting and running conditions to directly impose a starting or running program of modulation on the means responsive to temperature and manifold vacuum.

11. Means for metering fuel to an internal combustion engine, means for directly controlling the metering means including means directly responsive jointly to engine temperature and manifold vacuum operable to directly effect a selected one of starting and running programs of modulated control of said metering means, and means directly responsive to the condition of said engine as related to starting and running operable to directly select said program.

References Cited in the file of this patent

UNITED STATES PATENTS

| | | |
|---|---|---|
| 1,994,807 | Blake et al. | Mar. 19, 1935 |
| 2,195,927 | Hurst et al. | Apr. 2, 1940 |
| 2,600,368 | Winkler | June 10, 1952 |
| 2,664,872 | Ericson et al. | Jan. 5, 1954 |
| 2,667,154 | Ball | Jan. 26, 1954 |
| 2,731,175 | Downing | Jan. 17, 1956 |
| 2,785,669 | Armstrong | Mar. 19, 1957 |
| 2,851,026 | Dahl et al. | Sept. 9, 1958 |
| 2,896,602 | Dahl | July 28, 1959 |